United States Patent [19]
Stanley, Jr.

[11] Patent Number: 4,524,175
[45] Date of Patent: Jun. 18, 1985

[54] WATER-IN-OIL EMULSIONS OF HYDROPHOBE ASSOCIATION POLYMERS

[75] Inventor: Frederick W. Stanley, Jr., Midland, Mich.

[73] Assignee: The Dow Chemical Company, Midland, Mich.

[21] Appl. No.: 600,879

[22] Filed: Apr. 16, 1984

[51] Int. Cl.³ .......................... C08K 5/05; C08K 5/06; C08L 33/26
[52] U.S. Cl. .................................. 524/831; 524/801; 524/827
[58] Field of Search .................. 524/801, 827, 831

[56] References Cited

U.S. PATENT DOCUMENTS

| 3,247,171 | 4/1966 | Walker et al. | 526/287 |
| 3,284,393 | 11/1966 | Vanderhoff et al. | 526/911 |
| 3,624,019 | 11/1971 | Anderson et al. | 524/922 |
| 3,734,873 | 5/1973 | Anderson et al. | 523/336 |
| 3,984,333 | 10/1976 | Van De Kraats et al. | 525/341 |
| 3,998,777 | 12/1976 | Connelly et al. | 524/801 |
| 4,090,992 | 5/1978 | Scanley | 524/801 |
| 4,147,681 | 4/1979 | Lim et al. | 524/831 |
| 4,180,637 | 12/1979 | Evani et al. | 526/204 |
| 4,200,720 | 4/1980 | Evani et al. | 526/208 |
| 4,330,450 | 5/1982 | Lipowski et al. | 524/801 |
| 4,432,881 | 2/1984 | Evani | 524/436 |
| 4,435,528 | 3/1984 | Domina | 524/801 |
| 4,452,940 | 6/1984 | Rosen | 524/801 |

FOREIGN PATENT DOCUMENTS

EP 74660 3/1983 European Pat. Off. .
EP 74662 3/1983 European Pat. Off. .

Primary Examiner—Ronald W. Griffin

[57] ABSTRACT

A stable water-in-oil emulsion of a hydrophobe associative copolymer of a water-soluble monomer such as acrylamide and a hydrophobic monomer such as dodecyl methacrylate is formed by subjecting a water-in-oil emulsion of the corresponding monomers to copolymerization conditions in the presence of an oil-soluble initiator such as cumene hydroperoxide. Such copolymers associate in aqueous media containing salts such as sodium chloride to increase the viscosity of such media.

15 Claims, No Drawings

WATER-IN-OIL EMULSIONS OF HYDROPHOBE ASSOCIATION POLYMERS

BACKGROUND OF THE INVENTION

This invention relates to water-in-oil emulsions of hydrophobe association polymers and a method for the preparation thereof.

As taught in *Encyclopedia of Polymer Science and Technology,* Interscience Publishers, Vol. I, 192 (1964), it is known that the viscosity of an aqueous medium is increased by the addition of a water-soluble polymer. Such water-soluble polymers include polyacrylamide, acrylamide/acrylic acid copolymer, sodium polyacrylate, carboxymethyl cellulose, hydroxyethyl cellulose, methyl cellulose, polysaccharide as well as naturally occurring gums such guar gum and chemically modified gums such as hydroxypropyl guar gum. As a result of this thickening capability, there are many existing, as well as potential, industrial applications for aqueous media thickened with such water-swellable polymers. As taught in U.S. Pat. No. Re. 28,474, it is often desirable to prepare such polymers in the form of water-in-oil emulsions which are then inverted into aqueous media at the time of use.

Unfortunately, however, the aforementioned conventional water-soluble polymers suffer from many serious deficiencies or limitations in actual use in such industrial applications. For example, in many commercial applications, the polymers are exposed to shearing conditions which physically degrade them to lower molecular weight polymers thereby causing reduction of viscosity for the aqueous media containing them. Also, aqueous media containing the ionic water-soluble polymers exhibit substantial viscosity reduction when electrolytes are introduced into the media as is common in many applications, particularly in enhanced oil recovery. Finally, exposure of the aqueous media to high temperatures as is necessary for many applications normally causes a reduction in viscosity.

In attempts to overcome some of the aforementioned deficiencies of the conventional water-soluble polymers, it has been a common practice to cross-link the polymer in order to improve resistances to thermal as well as shear degradation. See, for example, U.S. Pat. No. 3,247,171. Such attempts have generally not been successful. More recently, as taught in U.S. Pat. No. 3,984,333, an aqueous medium has been thickened by dissolving a block copolymer having water-soluble blocks and water-insoluble blocks in the aqueous medium. While such block copolymers apparently exhibit reasonably good resistance to shear degradation, such polymers are difficult and often impractical to prepare. More importantly, such polymers do not exhibit significant tolerance of electrolytes normally present in the aqueous media to be thickened.

More recently, it has been discovered, as taught in U.S. Pat. No. 4,432,881, to employ dydrophobe association copolymers of water-soluble ethylenically unsaturated monomers and hydrophobic ethylenically unsaturated copolymers in combination with nonionic surfactants in order to overcome many of the aforementioned deficiencies of the conventional water-soluble polymers and recently developed substitutes therefore. Unfortunately, such hydrophobe association polymers could not be readily made in the form of emulsions and thus were not as easily handled and utilized as is desired for many applications.

SUMMARY OF THE INVENTION

The present invention is, in one aspect, a stable water-in-oil emulsion comprising (1) a continuous oil phase and dispersed therein (2) a discontinuous aqueous phase containing a hydrophobe associative copolymer of an ethylenically unsaturated, water-soluble monomer (hereinafter called a water-soluble monomer) and an ethylenically unsaturated monomer having a hydrophobic moiety capable of associating with similar hydrophobic moieties or hydrophobic groups of a water-soluble surfactant (hereinafter this monomer is called a hydrophobe monomer).

In another aspect, the present invention is a disperse phase polymerization method for making the aforementioned stable water-in-oil emulsion which method comprises subjecting a water-in-oil emulsion containing a water-soluble monomer and a hydrophobe monomer to copolymerization conditions in the presence of an initiating amount of an oil-soluble, vinyl polymerization initiator. Surprisingly, by carrying out the copolymerization in the presence of the oil-soluble initiator, the resulting copolymer exhibits greater hydrophobe associative characteristics than do copolymers prepared by disperse phase polymerization in the presence of the water-soluble initiators that are commonly employed in conventional disperse phase polymerization.

The copolymers prepared in the practice of this invention are useful in all applications which require aqueous media having increased viscosity such as drilling mud formulations, fracturing fluids, liquid mobility control agents, aqueous solutions of inorganic salts, hydraulic fluids, lubricants, friction reducing agents, suspending agents, aqueous suspensions of insoluble particulates such as paint formulations and the like.

DETAILED DESCRIPTION OF THE ILLUSTRATIVE EMBODIMENTS

The emulsions of the present invention are stable water-in-oil emulsions wherein the dispersed phase is an aqueous phase having dispersed therein a hydrophobe associative copolymer, as defined herein, and the continuous oil phase is a water-immiscible inert organic liquid. The ratio of the aqueous phase to the oil phase is suitably any ratio that permits the formation of a water-in-oil emulsion. Preferably, however, based on the total weight of the water-in-oil emulsion, the disperse phase constitutes from about 50 to about 90, more preferably from about 65 to about 80, weight percent of the emulsion. The continuous oil phase preferably constitutes from about 10 to about 50, more preferably from about 20 to about 35, weight percent of the emulsion. While the amount of copolymer present in the emulsion is not particularly critical, it is preferably in the range from about 10 to about 60, most preferably from about 20 to about 50, weight percent based on the emulsions.

The hydrophobe associative copolymer is a copolymer of a water-soluble ethylenically unsaturated monomer and an ethylenically unsaturated monomer having a hydrophobe associative moiety. By "hydrophobe associative" is meant that, in aqueous media, the hydrophobic moieties of the polymer associate with each other or with hydrophobic moieties of another compound such as a surfactant present in the aqueous medium, thereby increasing the viscosity of the aqueous medium. Additionally, it is observed that this property of hydrophobic association is even further enhanced by the addition of a water-soluble electrolyte to the aqueous medium. This further enhancement (increase) of viscosity resulting from the addition of the electrolyte occurs in the absence of any precipitation or phase separation. In fact, the occurrence of such precipitation or phase separation upon addition of the electrolyte is not desirable in the practice of this invention.

The hydrophobe associative copolymer is predominantly hydrophilic in that it is soluble to a level of at least 0.1 weight percent in an aqueous medium consisting of 0.2 weight percent of sodium chloride and 0.01 weight percent of a water-soluble, nonionic surfactant, as defined hereinafter, all percentages being based on the aqueous medium. However, it contains sufficient hydrophobic moieties to increase the viscosity of an aqueous medium containing a suitable water-dispersible surfactant as defined hereinafter. Preferably, the concentration of hydrophobic groups in the polymer is such that, when 0.5 weight part of the polymer is dissolved in 100 weight parts of the aqueous medium containing at least 0.01 weight percent of the surfactant and at least one weight percent of sodium chloride, the Brookfield viscosity (as defined hereinbefore) of the aqueous medium is substantially higher than, e.g., at least twice, that of a similar aqueous medium except that the polymer is identical in all respects to the hydrophobe associative polymer except that it contains no hydrophobic groups. For example, if an aqueous solution containing one weight percent of a surfactant, one weight percent of sodium chloride and one weight percent of polyacrylamide (hydrophilic polymer) has a Brookfield viscosity of 10 cps, the aqueous solution containing one weight percent of the same surfactant, one weight percent of sodium chloride and one weight percent of a suitable hydrophilic/hydrophobic polyacrylamide, e.g., an acrylamide/dodecyl acrylate copolymer having a $M_w$ equivalent to the polyacrylamide, will have a Brookfield viscosity of at least 20 cps.

Exemplary preferred copolymers include copolymers of from about 90 to about 99.995, more preferably from about 98 to about 99.995, most preferably from about 99 to 99.9, mole percent of one or more water-soluble monomers with from about 0.005 to about 10, more preferably from about 0.005 to 2, most preferably from 0.1 to about 1, mole percent of one or more hydrophobic monomers. For these polymers, it is found that preferred amounts of hydrophobic monomers will vary with the molecular weight of the polymer. For example, a hydrophilic/hydrophobic polymer having a weight average molecular weight near 200,000, preferably contains from about 1 to about 2 mole percent of hydrophobic monomer. Alternatively, the hydrophilic/hydrophobic polymer having a weight average molecular weight of 2 million preferably contains from about 0.05 to about 0.25 mole percent of hydrophobic monomer.

In general, the molecular weight of the hydrophobe associative copolymer is low enough such that an aqueous medium containing 0.1 weight percent of the polymer can be subjected to a degree of shear on the order of 10,000 sec$^{-1}$ without causing the polymer to degrade significantly. Moreover, the polymer has a molecular weight such that, when 0.5 weight part of the polymer and 0.5 weight part of the surfactant are dissolved in 100 weight parts of water, the Brookfield viscosity of the water is increased to at least 2 centipoises (as measured using a Brookfield LVT viscometer equipped with a UL adaptor and operated at 6 rpm and 25° C.). While polymers having very high molecular weight, e.g., weight average molecular weight ($M_w$) greater than 5 million, can be suitably employed, such polymers tend to degrade when subjected to high shear, e.g., in excess of 10,000 sec$^{-1}$. Accordingly such polymers are less preferred for some applications. Preferably, the hydrophilic/hydrophobic polymers used in this invention have weight average molecular weights ($M_w$) as determined by the intrinsic viscosity method described in the examples in the range from about 200,000 to about 5 million, most preferably from about 800,000 to about 2.5 million.

Water-soluble monomers suitably employed in the hydrophobe associative copolymers include those which are sufficiently water-soluble to form at least a 10 weight percent solution when dissolved in water and readily undergo addition polymerization to form polymers which are water-soluble. Exemplary water-soluble monomers include ethylenically unsaturated amides such as acrylamide, methacrylamide and fumaramide and their N-substituted derivatives such as 2-acrylamido-2-methylpropane sulfonic acid (AMPS), N-(dimethylaminomethyl)acrylamide as well as N-(trimethylammoniummethyl)acrylamide chloride and N-(trimethylammoniumpropyl)methacrylamide) chloride; ethylenically unsaturated carboxylic acids such as acrylic acid, methacrylic acid, itaconic acid and fumaric acid; and other ethylenically unsaturated quaternary ammonium compounds such as vinylbenzyl trimethyl ammonium chloride, sulfoalkyl esters of unsaturated carboxylic acids such as 2-sulfoethyl methacrylate, aminoalkyl esters of unsaturated carboxylic acids such as 2-aminoethyl methacrylate, vinyl amines such as vinyl pyridine and vinyl morpholine, diallyl amines and diallyl ammonium compounds such as diallyl dimethyl ammonium chloride, vinyl heterocyclic amides such as vinyl pyrrolidone, vinylaryl sulfonates such as vinylbenzyl sulfonate as well as the salts of the foregoing monomers. Of the foregoing water-soluble monomers, acrylamide and combinations of acrylamide and acrylic acid, including salts of acrylic acid such as sodium acrylate or ammonium acrylate, are preferred. Acrylamide and combinations thereof with up to 75 mole percent of acrylic acid or salt thereof, based on total water-soluble monomer, are more preferred. Most preferred are polymers wherein the water-soluble monomer is a mixture of acrylamide with from about 5 to about 50 mole percent, especially from about 5 to about 30 mole percent of acrylic acid or salt thereof.

Suitable hydrophobic monomers include those which are (1) water-insoluble, i.e., less than 0.2 weight part of the hydrophobic monomer will dissolve in 100 weight parts water and (2) ethylenically unsaturated compounds having hydrophobe associative groups (hereincalled hydrophobic moieties).

The hydrophobic moieties preferably have at least 8 carbon atoms and are most preferably pendant organic groups having hydrophobicities comparable to one of the following: aliphatic hydrocarbon groups having at least four carbons such as $C_4$ to $C_{20}$ alkyls and cycloalkyls; polynuclear aromatic hydrocarbon groups such as napthyls; alkylaryls wherein alkyl has one or more carbons, preferably 4 to 8 carbons; haloalkyls of 4 or more carbons, preferably perfluoroalkyls; polyalkyleneoxy groups wherein alkylene is propylene or higher alkylene and there is at least 1 alkyleneoxy unit per hydrophobic moiety. Exemplary hydrophobic monomers include the higher alkyl esters of α,β-ethylenically unsaturated carboxylic acids such as dodecyl acrylate, dodecyl methacrylate, tridecyl acrylate, tridecyl methacrylate, tetradecyl acrylate, tetradecyl methacrylate, octadecyl acrylate, octadecyl methacrylate, ethyl half ester of maleic anhydride, diethyl maleate, and other alkyl esters derived from the reactions of alkanols having from 4 to 20, preferably from 8 to 20, carbon atoms with ethylenically unsaturated carboxylic acids such as acrylic acid, methacrylic acid, maleic anhydride, fumaric acid, itaconic acid and aconitic acid; alkylaryl esters of ethylenically unsaturated carboxylic acids such as nonyl-α-phenyl acrylate, nonyl-α-phenyl methacrylate, dodecyl-α-phenyl acrylate and dodecyl-α-phenyl methacrylate; N-alkyl, ethylenically unsaturated amides such as N-octadecyl acrylamide; N-octadecyl methacrylamide, N,N-dioctyl acrylamide and similar derivatives thereof; α-olefins such as octene-1, decene-1, dodecene-1 and hexadecene-1; vinyl alkylates wherein alkyl has at least 8 carbons such as vinyl laurate and vinyl stearate; vinyl alkyl ethers such as dodecyl vinyl ether and hexadecyl vinyl ether; N-vinyl amides such as N-vinyl lauramide and N-vinyl stearamide; and aralkylstyrenes such as t-butyl styrene. Of the foregoing hydrophobic monomers, the alkyl esters of acrylic acid, methacrylic acid, N-alkyl acrylamides and N-alkyl methacrylamides wherein alkyl has from 8 to 20 carbon atoms, and the alkyl styrenes wherein alkyl has from 4 to 8 carbons such as t-butyl, are preferred. The alkyl methacrylates wherein alkyl has from 10 to 20 carbon atoms and t-butyl styrene are more preferred. Dodecyl methacrylate and N-dodecyl methacrylamide are the most preferred where hydrolysis is not a problem. In applications wherein hydrolysis is a problem such as in caustic floods, t-butyl styrene is most preferred.

Emulsions of the aforementioned hydrophobe associative copolymers are advantageously prepared by copolymerizing the water-soluble monomers with hydrophobic monomers dispersed in a water-in-oil emulsion. The conditions and procedures employed are generally those described in U.S. Pat. Nos. 3,284,393; 3,624,019; and 3,734,873, except that an oil-soluble initiator is employed. Employing such conditions and procedures, an aqueous solution of water-soluble monomer(s) is first dispersed in the inert hydrophobic organic liquid containing the hydrophobic monomer and a sufficient amount of a water-in-oil emulsifying agent to form a water-in-oil emulsion.

The water-immiscible oil phase of the emulsion generally comprises at least one inert hydrophobic liquid. Usually such liquid is an organic liquid such as a liquid hydrocarbon or substituted hydrocarbon. Preferred organic liquids are the halogenated hydrocarbons such as perchloroethylene, methylene chloride and the like as well as liquid hydrocarbon having from 4 to 15 carbons per molecule including aromatic and aliphatic hydrocarbons and mixtures thereof, e.g., benzene, xylene, toluene, mineral oils, liquid paraffins such as kerosene, naphtha and the like. Of the foregoing organic liquids, the hydrocarbons are the more preferred, with aliphatic hydrocarbons being most preferred.

Emulsifiers suitably employed for purposes of emulsifying the aqueous phase in the oil phase are those emulsifiers that promote the formation and stabilization of water-in-oil emulsions. Normally such emulsifiers have a hydrophilic-lipophilic balance (HLB) in the range from about 2 to about 9, most preferably from about 3 to 6. Preferably, the emulsifying agent is sorbitan monooleate, the reaction product of oleic acid with isopropanolamide or a mixture thereof. Other suitable emulsifying agents include hexadecyl sodium phthalate, decyl sodium phthalate, octadecyl sodium phthalate, sorbitan monooleate, sorbitan stearate, glycerine mono- or distearate and combinations of such emulsifying agents. Generally, the emulsifier is used in amounts sufficient to provide the desired water-in-oil emulsion. This amount is normally in the range from about 0.1 to about 20, preferably from about 3 to about 5, weight percent based on the weight of monomer.

Prior to polymerization, an oil-soluble free-radical generating initiator is added to the emulsion. By an "oil-soluble" catalyst is meant one which is sufficiently soluble in the oil phase of the emulsion that an initiating amount, preferably from about 0.01 to about 90, most preferably from about 0.1 to about 90, weight percent of the catalyst based on the oil phase will dissolve in the oil phase. Examples of preferred oil-soluble initiators include diisopropyl peroxydicarbonate, 4-(t-butylperoxylperoxycarbonyl)-3-hexyl-6-[7-(t-butylperoxycarbonyl)heptyl]cyclohexene (4-TBPCH), cumene hydroperoxide and t-butyl peroxyneodecanoate, with 4-TBPCH and cumene hydroperoxide being most preferred. Examples of suitable, but less preferred initiators include t-butly hydroperoxide and benzoyl peroxide. The oil-soluble initiator is added in a catalytic amount, preferably from about 0.001 to about 10, most preferably from about 0.01 to about 1, weight percent based on total monomers. In addition to the aforementioned ingredients, the emulsion polymerization recipe optionally includes chain transfer agents, chelating agents, buffers, salts, and the like.

The resulting stable water-in-oil emulsion of monomer(s) is then heated under free-radical forming conditions in order to copolymerize the monomers to form a water-in-oil emulsion of the hydrophobe associative polymer.

The temperature of copolymerization is any temperature which is sufficient to cause the initiator to form free radicals, preferably from about 10° C. to about 90° C., most preferably from about 20° C. to about 60° C. The copolymerization is typically carried out under an inert atmosphere such as a nitrogen atmosphere.

When ready for use, the resulting emulsions are readily inverted into an aqueous phase by adding a water-soluble surfactant such as described in U.S. Pat. No. 3,624,019. Preferably, this inverting surfactant is a nonionic water-dispersible surfactant having hydrophobe moieties capable of associating in an aqueous medium with the hydrophobic groups of the hydrophobe associative copolymer, thereby causing a significant increase in viscosity of the aqueous medium under the conditions described in U.S. patent application Ser. No. 232,327, filed Feb. 6, 1981, now U.S. Pat. No. 4,432,881, issued Feb. 21, 1984. Examples of water-dispersible surfactants preferred for this purpose include alkyl polyethyleneoxy compounds represented by the formula, $RO(EO)_n$—H, wherein R is $C_8$–$C_{18}$ alkyl, EO is ethyleneoxy and n is a number from 1 to 10. Other suitable nonionic surfactants are described in McCutcheon's, *Detergents and Emulsifiers*, North American Edition, 1980 Annual. Of the foregoing surfactants, the ethoxylated alkyl phenol and ethoxylated fatty alcohols are more preferred. Usually, the ratio of the surfactant to hydrophobe associative copolymer is one that produces a viscosity at least twice that of a solution containing only the polymer. Preferably, the weight ratio of the copolymer to surfactant is from about 20:1 to about 0.5:1, most preferably from about 10:1 to about 1:1.

The amount of hydrophobic associative composition, i.e., the combination of hydrophobe associative copolymer and surfactant, in the aqueous medium being used is sufficient to provide the desired increase in viscosity of the aqueous medium. Preferably, such amounts of agent range from about 0.01 to about 1.5 weight percent, most preferably from about 0.05 to about 1 weight percent, based on the aqueous medium.

In addition to the hydrophobe associative copolymer and water-dispersible surfactant, the hydrophobic associative composition may also contain or be used in combination with a non-polymeric, water-soluble electrolyte including salts of monovalent and divalent cations such as ammonium, alkali metal and alkaline earth metal chlorides, bromides, nitrates, sulfates, carbonates, acetates and the like; monobasic and di- and tribasic acids such as hydrochloric acid, sulfuric acid, phosphoric acid and oxalic acid; and monovalent bases such as sodium hydroxide and potassium hydroxide. Such electrolytes may be present in the aqueous media as in the case of brines and other aqueous media containing water-soluble salts of various metals and other water-soluble electrolytes. Such aqueous media often contain from about 0.01 to about 20 weight percent of salts of alkali metals and alkaline earth metals. These electrolytes generally reduce the critical micelle concentration of the surfactant when added to an aqueous medium containing the surfactant. Thus, such electrolytes enhance hydrophobic association between the hydrophobe associative copolymer and the water-dispersible surfactant.

In addition to the hydrophobic associative composition and electrolyte (salt), the aqueous medium may contain a variety of other ingredients common to mobility control fluids, fracturing fluids, drilling muds, or other additives depending upon the intended use of the aqueous medium. The aqueous medium may also contain various additives such as antioxidants and antimicrobials, stabilizers, fillers and the like.

In general, the hydrophobe associative compositions described herein are useful in the same applications and under the same conditions as disclosed for the hydrophobe associative compositions described in U.S. patent application Ser. No. 232,327, filed Feb. 6, 1981.

The following examples are given to illustrate the invention and should not be construed as limiting its scope. Unless otherwise indicated, all parts and percentages are by weight.

A. EMULSION PREPARATION

Example 1

A water-in-oil emulsion of an acrylamide/dodecyl methacrylate copolymer is prepared by first dispersing 112.5 g of acrylamide and 0.09 g of the pentasodium salt of diethylenetriaminepentaacetic acid in 166.5 g of water to form the aqueous phase. The oil phase is made by dissolving 2.25 g of sorbitan monooleate, 3.3 g of isopropanolamide of oleic acid, and 12 g of dodecyl methacrylate in 103.2 g of Isopar ® M (a liquid hydrocarbon). The aqueous phase is then added to the oil phase in a Waring blender operating at its highest speed. The resulting water-in-oil emulsion is transferred to a 500-ml resin pot equipped with an agitator and a $N_2$ purge tube. After the pot is purged with nitrogen for one hour, 1 g of a 10 percent solution of diisopropyl peroxydicarbonate in Isopar ® M, a preferred oil-soluble initiator is added to the emulsion at 20° C. while continuing the nitrogen purge and agitation of the emulsion. The temperature of the emulsion rises to 50° C. in 20 minutes and is maintained in the range of 40° C.–50° C. during the remainder of the polymerization (i.e., about 4 hours). The resulting water-in-oil emulsion of acrylamide/dodecyl methacrylate copolymer (32.5 percent polymer solids) is recovered from the resin pot.

Example 2

Following the procedure of Example 1, a water-in-oil emulsion containing the monomers used in Example 1 is prepared and purged with $N_2$ for one hour. To the emulsion at 24° C. is added 1 mil of a 10 percent solution of 4-(t-butylperoxylperoxycarbonyl)-3-hexyl-6-[7-(t-butlyperoxycarbonyl)heptyl]cyclohexene in Isopar ® M, and a nitrogen stream containing 0.1 percent $SO_2$ is bubbled into the emulsion thereby providing a preferred oil-soluble redox initiator. The temperature rises to 50° C. in 10 minutes and is maintained at 40° C.–50° C. during the remainder of the copolymerization (i.e., about 4 hours).

Example 3

A water-in-oil emulsion of acrylamide/dodecyl methacrylate copolymer is made following the procedure of Example 1 except that 1 ml of an aqueous solution of t-butyl hydroperoxide (0.36 g in 10 ml of water) is employed as suitable oil-soluble (>50 percent) initiator which is also slightly (1–5 percent) soluble in water. The polymerization is initiated by bubbling a stream of nitrogen containing 0.1 percent $SO_2$ through the emulsion at 20° C. The temperature of the emulsion increased to 45° C. in 10 minutes and is maintained at 45° C. for the remainder of the copolymerization (i.e., about 4 hours). The resulting water-in-oil emulsion containing 32.5 percent copolymer solids is recovered.

Example C (Comparison example)

A water-in-oil emulsion of an acrylamide/dodecyl methacrylate is made following the procedure of Example 1 except that 2 ml of an aqueous solution of 2,2'-azobis(amidinopropane)hydrochloride (0.56 g in 10 ml of $H_2O$) is employed as a water-soluble, oil-insoluble initiator and is added to the aqueous phase prior to forming the emulsion. The emulsion is heated to 35° C. and maintained at 40° C.–50° C. until polymerization is completed (i.e., about 4 hours).

B. POLYMER EVALUATION

To more clearly observe the association effects and remove any interferences of the emulsifiers, polymers are precipitated from the emulsions using methanol. The procedure is as follows: 100 g of emulsion is added to 500 ml of methanol in a Waring blender. After stirring for 1 minute, the resulting suspension is filtered. After filtration the sample is resuspended in 500 ml of MeOH and filtered two additional times. The copolymer is air dried overnight. Infrared analyses of the copolymer shows it to be free of emulsifying surfactants.

To test for association, the copolymer solutions are made up in 3 percent NaCl containing various levels of a hydrophobe associative surfactant. The procedure is as follows: To 100 g of a 0.75 percent solution of polymer in 3 percent solution of sodium chloride in water is added 0, 20, 40, 60, 80 and 100 percent of an ethoxylated aliphatic alcohol based on copolymer. Subsequently, an aqueous solution of sodium lauryl sulfate is added to the resulting solutions. The solutions are shaken until the copolymer dissolves. The viscosities of the solutions are then measured using a Brookfield LVT SC4 viscometer at 25° C. A 18/13 spindle is used at 6 rpm. The data is shown in Table I.

TABLE I

| Sample No. | Copolymer[1] | % NaLS[2] | % TDA-6[3] | Viscosity[4] cps |
|---|---|---|---|---|
| 1 | Ex. 1 | 0.075 | 0 | insoluble |
| 2 | Ex. 1 | 0.075 | 20 | 900 |
| 3 | Ex. 1 | 0.075 | 40 | 1200 |
| 4 | Ex. 1 | 0.075 | 60 | 1200 |
| 5 | Ex. 1 | 0.075 | 80 | 1400 |
| 6 | Ex. 1 | 0.075 | 100 | 1600 |
| 7 | Ex. 2 | 0.075 | 0 | insoluble |
| 8 | Ex. 2 | 0.075 | 20 | 300 |
| 9 | Ex. 2 | 0.075 | 40 | 600 |
| 10 | Ex. 2 | 0.075 | 60 | 1500 |
| 11 | Ex. 2 | 0.075 | 80 | not measured |
| 12 | Ex. 2 | 0.075 | 100 | 3500 |
| 13 | Ex. 3 | 0.075 | 0 | insoluble |
| 14 | Ex. 3 | 0.075 | 20 | 100 |
| 15 | Ex. 3 | 0.075 | 40 | 110 |
| 16 | Ex. 3 | 0.075 | 60 | 120 |
| 17 | Ex. 3 | 0.075 | 80 | 250 |
| 18 | Ex. 3 | 0.075 | 100 | 340 |
| 19* | Ex. C | 0.075 | 0 | 325 |
| 20* | Ex. C | 0.075 | 20 | 280 |
| 21* | Ex. C | 0.075 | 40 | 250 |
| 22* | Ex. C | 0.075 | 60 | 350 |
| 23* | Ex. C | 0.075 | 80 | 400 |
| 24* | Ex. C | 0.075 | 100 | 410 |

*Not an example of the invention.
[1]Copolymer as described in the named example at 0.75 percent concentration based on the aqueous medium (including 3% NaCl) being tested for viscosity.
[2]NaLS — an aqueous solution of 10% sodium lauryl sulfate in water is added to the aqueous medium to provide the concentration indicated which is based on the weight of the aqueous medium being tested for viscosity.
[3]TDA-6 — ethoxylated tridecyl ether added as 100% active composition to provide the indicated concentration based on the aqueous medium being tested for viscosity.
[4]Brookfield viscosity in centipoise using a Brookfield LVT SC4 viscometer operating a 18/13 spindle at 6 rpm and 25° C.

Only the copolymer made with the water-soluble initiator (Example C) is soluble in 3 percent salt solution. The rest are either partially or completely water-insoluble. However, as TDA-6 surfactant is added the viscosity of these solutions (Examples 1-3) increases dramatically while the copolymer made with a water-soluble initiator changed only slightly. Also the copolymers made with completely oil-soluble initiators (Examples 1 and 2) had larger viscosity increases than the polymer made with TBHP which is partially soluble in both the oil and aqueous phases. The increase in viscosity with surfactant addition is typical behavoir of association polymers as the surfactant associates with the hydrophobic groups to solubilize the polymer.

What is claimed is:

1. A stable water-in-oil emulsion comprising (1) a continuous oil phase and dispersed therein (2) a discontinuous aqueous phase containing a hydrophobe associative copolymer of an ethylenically unsaturated water-soluble monomer and an ethylenically unsaturated monomer having a hydrophobic moiety having at least 8 carbons capable of associating with a similar hydrophobic moiety or a hydrophobic moiety of a water-soluble surfactant.

2. The emulsion of claim 1 wherein the copolymer is a copolymer of from about 40 to about 99.9 mole percent of acrylamide, from 0 to about 50 mole percent of acrylic acid and from about 0.1 to about 10 mole percent of an alkyl methacrylate or acrylate wherein alkyl has from 8 to 12 carbon atoms, or an ar-alkyl styrene wherein alkyl has from 4 to 8 carbons, said copolymer having a weight average molecular weight in the range from about 800,000 to about 2.5 million.

3. The emulsion of claim 2 wherein the copolymer is a copolymer of from about 60 to about 99.9 mole percent of acrylamide, from 0 to about 30 mole percent of acrylic acid and from about 0.1 to about 10 weight percent of dodecyl methacrylate.

4. The emulsion of claim 3 wherein the oil phase is a normally liquid aliphatic hydrocarbon.

5. An aqueous composition comprising the emulsion of claim 1 and an inverting amount of a non-ionic water-dispersible surfactant having hydrophobic moieties capable of associating with the hydrophobic moieties of the copolymer of the emulsion.

6. The composition of claim 5 wherein the nonionic surfactant is an ethoxylated aliphatic alcohol or an alkyl polyethyleneoxy glycol monoether or alkylaryl polyethyleneoxy glycol monoether wherein alkyl has from 8 to 20 carbon atoms and from about 1 to 20 ethyleneoxy groups per polymer molecule.

7. The composition of claim 6 wherein the surfactant is a dodecyl polyethyleneoxy glycol monoether wherein the monoether has about 1 to 10 ethyleneoxy groups per molecule or an ethoxylated tridecyl ether.

8. The composition of claim 6 which contains an amount of a water-soluble non-polymeric electrolyte sufficient to increase the viscosity of the composition.

9. The composition of claim 8 wherein the electrolyte is a salt of alkali metal or alkaline earth metal or a combination of two or more of such salts.

10. The aqueous composition of claim 9 comprising the aqueous medium and from about 0.01 to about 1 weight percent of the copolymer and from about 0.0015 to about 0.5 weight percent of the monoether and from about 0.01 to about 20 weight percent of an alkali metal salt, an alkaline earth metal salt or a combination of two or more of such salts.

11. A disperse phase polymerization method which comprises subjecting a water-in-oil emulsion containing a water-soluble, ethylenically unsaturated monomer and an ethylenically unsaturated monomer having an associating hydrophobic moiety, to copolymerization conditions in the presence of an initiating amount of an oil-soluble, vinyl polymerization initiator thereby forming the emulsion of claim 1.

12. The method of claim 11 wherein the oil-soluble initiator is diisopropyl peroxydicarbonate, 4-(t-butylperoxylperoxycarbonyl)-3-hexyl-6-[7-(t-butylperoxycarbonyl)heptyl]cyclohexene, cumene hydroperoxide or t-butylperoxyneodecanoate.

13. The method of claim 12 wherein the initiator is cumene hydroperoxide or 4-(t-butylperoxylperoxycarbonyl)-3-hexyl-6-[7-(t-butylperoxycarbonyl)heptyl]cyclohexene.

14. A disperse phase polymerization method which comprises subjecting a water-in-oil emulsion containing (1) acrylamide or a mixture of acrylamide and acrylic acid and (2) an alkyl methacrylate or acrylate wherein alkyl has from 8 to 12 carbon atoms or an ar-alkyl styrene wherein alkyl has from 4 to 8 carbons to copolymerization conditions in the presence of an initiating amount of cumene hydroperoxide or 4-(t-butylperoxylperoxycarbonyl)-3-hexyl-6-[7-(t-butylperoxycarbonyl)-heptyl]cyclohexene thereby forming the emulsion of claim 2.

15. A disperse phase polymerization method which comprises subjecting a water-in-oil emulsion containing (1) acrylamide or a mixture of acrylamide and acrylic acid and (2) dodecyl methacrylate to copolymerization conditions in the presence of an initiating amount of diisopropyl peroxydicarbonate, 4-(t-butylperoxylperoxycarbonyl)-3-hexyl-6-[7-(t-butylperoxycarbonyl)heptyl]cyclohexene, cumene hydroperoxide or t-butylperoxyneodecanoate thereby forming the emulsion of claim 3.

* * * * *